(12) United States Patent
Shen et al.

(10) Patent No.: US 8,482,589 B2
(45) Date of Patent: Jul. 9, 2013

(54) LIGHT EMITTING CONTROL DEVICE AND METHOD THEREOF FOR LIGHT EMITTING DIODE PRINT HEAD

(75) Inventors: Wei-Ming Shen, Hsinchu (TW); Wen-Lung Chang, Hsinchu (TW)

(73) Assignee: Aetas Technology Incorporated, Arcadia, CA (US)

( * ) Notice: Subject to any disclaimer, the term of this patent is extended or adjusted under 35 U.S.C. 154(b) by 576 days.

(21) Appl. No.: 12/762,360

(22) Filed: Apr. 18, 2010

(65) Prior Publication Data

US 2011/0254460 A1    Oct. 20, 2011

(51) Int. Cl.
*B41J 2/435* (2006.01)
*B41J 2/47* (2006.01)

(52) U.S. Cl.
USPC .......................................... 347/237; 347/247

(58) Field of Classification Search
USPC .......... 347/229, 234, 235, 237, 238, 247–250
See application file for complete search history.

(56) References Cited

U.S. PATENT DOCUMENTS 4,799,110 A * 1/1989 Hisada et al. ................. 382/245

* cited by examiner

*Primary Examiner* — Hai C Pham
(74) *Attorney, Agent, or Firm* — Winston Hsu; Scott Margo

(57) ABSTRACT

A light emitting control device for a light emitting diode print head includes a control unit, a pulse-mask unit, a strobe unit and a data output unit. The pulse-mask unit outputs n clock signals in sequence to a light emitting diode print head. The strobe unit outputs a strobe signal to the light emitting diode print head, so as to switch on the light emitting diode print head. The data output unit outputs a print data signal to the light emitting diode print head. When the pulse-mask unit outputs a k-th clock signal of the n clock signals, the pulse-mask unit delays the k-th clock signal for a predetermined time, and the data output unit pauses outputting the print data signal. After the predetermined time, the pulse-mask unit and the data output unit continue to output the rest of the clock signals and the print data signal.

10 Claims, 4 Drawing Sheets

LIGHT EMITTING CONTROL DEVICE AND METHOD THEREOF FOR LIGHT EMITTING DIODE PRINT HEAD

BACKGROUND OF THE INVENTION

1. Field of the Invention

The invention relates to a light emitting control device and method thereof for a light emitting diode print head and, more particularly, to a light emitting control device and method thereof capable of effectively enhancing a light emitting time of a light emitting diode print head.

2. Description of the Prior Art

A printer is a computer output apparatus for printing text or image data stored in a computer on papers or other printing media. A Conventional printing process of the printer comprises following steps of: applying a charging voltage to a photosensitive member; exposing the photosensitive member by an optical writing device to form a latent image on a charged surface of the photosensitive member; developing the toner carried in a toner cartridge to the photosensitive member and the photosensitive member applies the toner to the latent image to form a toner image; transferring the toner image on the printing media (e.g. papers); and fusing the toner image onto the printing media by a fuser module. The optical writing device can be a laser light source or an LED light source.

Referring to FIG. 1, FIG. 1 is a timing chart of conventional printing technology. In the system of a conventional print head, a light emitting time of the print head is determined by a clock signal, a print data signal and a strobe signal. As shown in FIG. 1, Tp represents one period of the clock signal and Tms represents the maximum light emitting time. If there are n clock signals, a relation between Tp and Tms is as follows, Tms=Tp*n. Generally speaking, a band width of the strobe signal is determined by a number of the clock signals. Accordingly, the light emitting time is determined by the clock signals and the print data signal. However, the conventional printing technology will have the following problems. Although the print head is completely switched on within the length of the print data signal, the light emitting time is sometimes not sufficient so as to affect printing quality. Therefore, only the clock signals can be adjusted to solve the aforesaid problems.

If one desires to enhance the maximum light emitting time, reduction in the frequency of the clock signals for the print head is required. Several prior arts are disclosed as follows:

1) In case not to change the clock signals in the system, a frequency dividing method can be used. This method can be achieved by little modification of circuit design, but it can only be divided by a multiple of 2. Even if only little enhancement of the maximum light emitting time is required, time for transferring print data will increase a lot such as at least two times, such that the efficiency of the whole system will decrease.

2) In case not to change the clock signals, a circuit such as Phase-Locked Loop (PLL) circuit or any other circuits can be used, so as to arbitrarily change the output frequency of the clock signals. Accordingly, it can enhance the maximum light emitting time without increasing too much time for transferring print data. However, the circuit design will get complicated.

3) In case to change the clock signals for the whole system, the maximum light emitting time can be enhanced without additional circuit design. Since the clock signals in the system are changed, other control signals should also be changed and system parameters should also be reset. As a result, it will increase the complexity of firmware design.

SUMMARY OF THE INVENTION

An objective of the invention is to provide a light emitting control device and method thereof for a light emitting diode print head, such that the aforesaid problems can be solved.

According to one embodiment of the invention, a light emitting control device for a light emitting diode print head comprises a control unit, a pulse-mask unit, a strobe unit and a data output unit. The pulse-mask unit is controlled by the control unit to output n clock signals in sequence to the light emitting diode print head, wherein n is a positive integer. The strobe unit is controlled by the control unit to output a strobe signal to the light emitting diode print head, so as to switch on the light emitting diode print head. The data output unit is controlled by the control unit to output a print data signal to the light emitting diode print head. When the pulse-mask unit outputs a k-th clock signal of the n clock signals, the pulse-mask unit delays the k-th clock signal for a predetermined time, and the data output unit pauses outputting the print data signal, wherein k is a positive integer smaller than or equal to n. After the predetermined time, the pulse-mask unit and the data output unit continue to output the rest of the clock signals and the print data signal.

The light emitting control device further comprises a first counter for calculating a number of the clock signals which have been output.

The light emitting control device further comprises a second counter for calculating the predetermined time.

The predetermined time is r times a period of the clock signal, and r is a positive integer.

k is a median of n.

According to another embodiment of the invention, a light emitting control method for a light emitting diode print head comprises steps of: outputting n clock signals in sequence to the light emitting diode print head, wherein n is a positive integer; outputting a strobe signal to the light emitting diode print head to switch on the light emitting diode print head; outputting a print data signal to the light emitting diode print head; delaying a k-th signal of the n clock signals for a predetermined time and pausing outputting the print data signal, wherein k is a positive integer smaller than or equal to n; and after the predetermined time, continuing to output the rest of the clock signals and the print data signal.

The light emitting control method further comprises step of calculating a number of the clock signals which have been output while outputting the n clock signals in sequence.

The light emitting control method further comprises step of calculating the predetermined time while delaying the k-th clock signal.

The predetermined time is r times a period of the clock signal, and r is a positive integer.

k is a median of n.

Based on the aforesaid embodiments, the light emitting control device and method thereof for the light emitting diode print head of the invention at least have following advantages and benefits. The invention delays one of the clock signals and corresponding print data signal, so as to enhance the maximum light emitting time of the light emitting diode print head. Enhancement of the light emitting time is the aforesaid predetermined time. Accordingly, the time for transferring print data will also increase the predetermined time rather than double the original print time. In circuit design, it only needs a few more circuits. Furthermore, due to no change of the clock signal in the system, the original parameters for firmware can still be applied.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
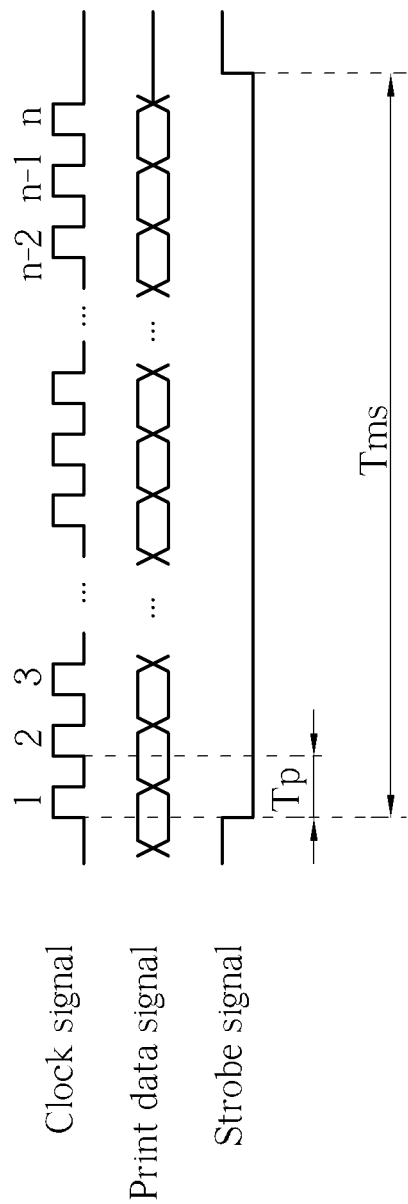
FIG. 1 is a timing chart of conventional printing technology.
Figure 2:
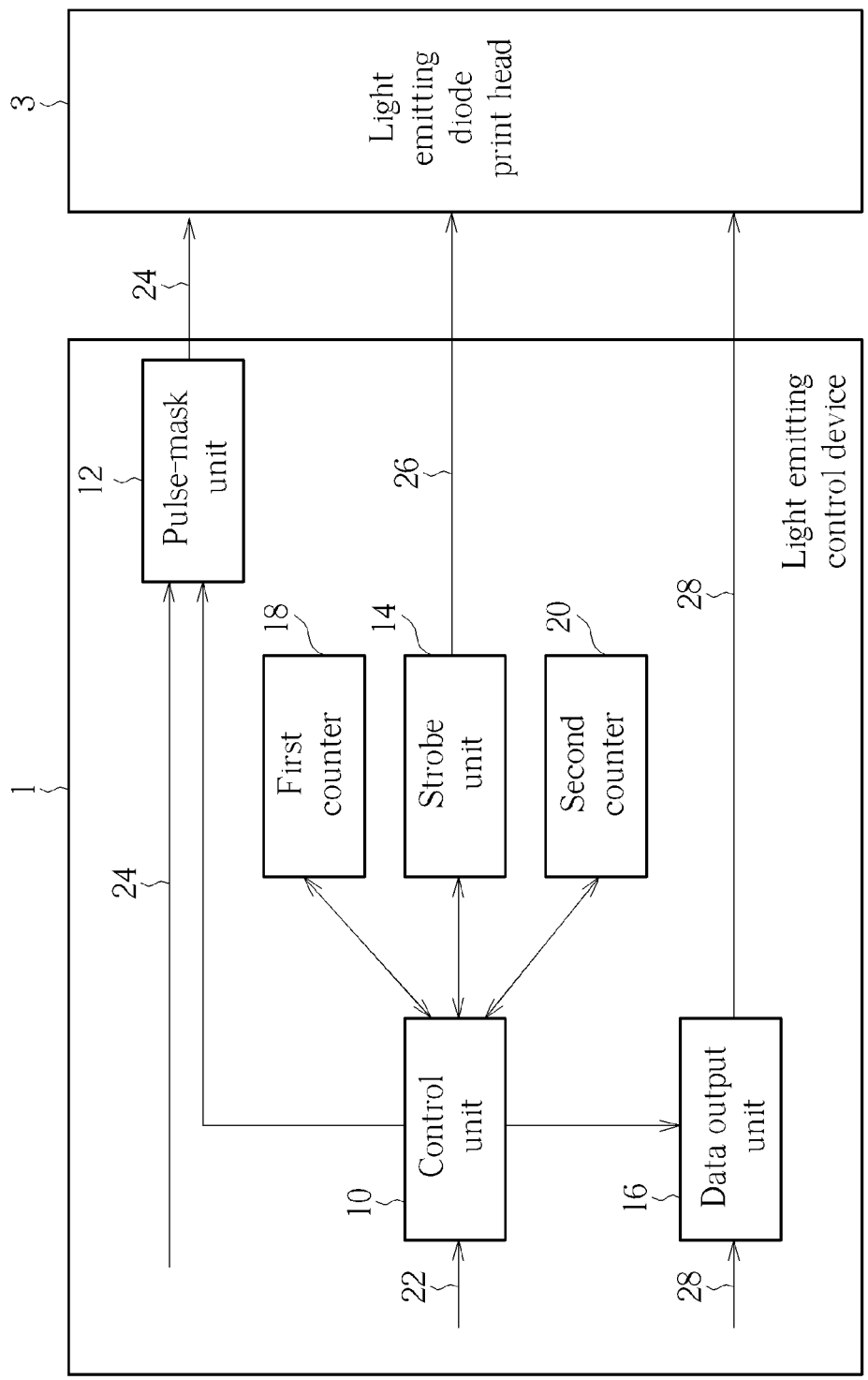
FIG. 2 is a functional block diagram illustrating a light emitting control device according to one embodiment of the invention.

Referring to FIG. 2, FIG. 2 is a functional block diagram illustrating a light emitting control device 1 according to one embodiment of the invention. As shown in FIG. 2, the light emitting control device 1 is electrically connected to a light emitting diode print head 3. The light emitting control device 1 comprises a control unit 10, a pulse-mask unit 12, a strobe unit 14, a data output unit 16, a first counter 18 and a second counter 20. The pulse-mask unit 12, the strobe unit 14, the data output unit 16, the first counter 18 and the second counter 20 are electrically connected to the control unit 10, respectively. Generally speaking, the light emitting diode print head 3 can be made of a plurality of light emitting diode array chips and driving chips.

In the beginning of printing, a system will output a starting signal 22 to the control unit 10 for the sake of driving the control unit 10 to switch on the light emitting diode print head 3. In the meanwhile, the pulse-mask unit 12 is controlled by the control unit 10 to output n clock signals 24 in sequence to the light emitting diode print head 3, wherein n is a positive integer. Fox example, if a light emitting diode array comprises 48 light emitting diodes, n is 48. Besides, the strobe unit 14 is controlled by the control unit 10 to output a strobe signal 26 with low level to the light emitting diode print head 3 so as to switch on the light emitting diode print head 3. The data output unit 16 is controlled by the control unit 10 to output a print data signal 28 to the light emitting diode print head 3. It should be noticed that the print data will be transformed from parallel data to serial data in the data output unit 16.

Figure 3:
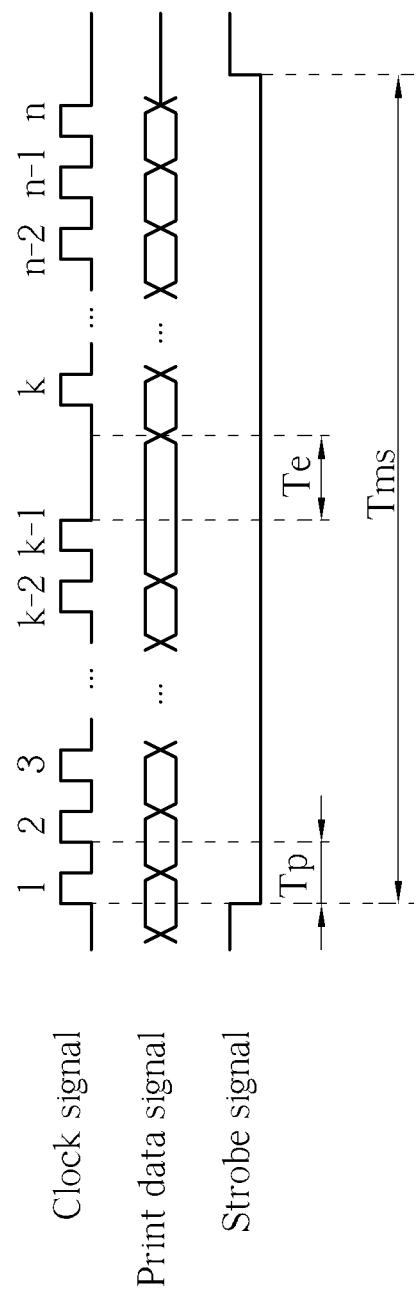
FIG. 3 is a timing chart of the light emitting diode print head according to one embodiment of the invention.

Referring to FIG. 3, FIG. 3 is a timing chart of the light emitting diode print head 3 according to one embodiment of the invention. As shown in FIG. 3, Tp represents a period of one clock signal, Tms represents a maximum light emitting time, and Te represents a predetermined time increased in the light emitting time. If there are n clock signals, a relation between Tp, Tms and Te is as follows, Tms=Tp*n+Te. In this embodiment, the first counter 18 will calculate a number of the clock signals which have bee output while the pulse-mask unit 12 outputs the n clock signals in sequence. According to the calculation of the first counter 18, when the pulse-mask 12 outputs the k-th clock signal of the n clock signals, the control unit 10 will control the pulse-mask unit 12 to delay the k-th clock signal for a predetermined time Te and control the data output unit 16 to pause outputting the print data signal, wherein k is a positive integer smaller than or equal to n herein. Preferably, k can be a median of n. Fox example, if n is 48, k can be 24. Certainly, the k-th clock signal can be any one of the n clock signals from 1 to n, and it can be determined by practical applications.

In this embodiment, the predetermined time Te can be r times the period Tp of the clock signal (i.e. Te=Tp*r), wherein r is a positive integer. While delaying the k-th clock signal, the second counter 20 starts to calculate the time. After the delay time reaches from 0 to the predetermined time Te, i.e. after the predetermined time Te, the control unit 10 will control the pulse-mask unit 12 and the data output unit 16 to continue to output the rest of the clock signals and the print data signal. When the last clock signal (i.e. the n-th clock signal) is sent, the control unit 10 will control the strobe unit 14 to pull the strobe signal to a high level, so as to switch off the light emitting diode print head 3. It should be noticed that the aforesaid value of r is determined according to the property of the light emitting diode print head 3 and a photosensitive member while a printer is manufactured. For example, the higher the sensitivity of the photosensitive member is, the smaller the value of r is; alternatively, the lower the sensitivity of the photosensitive member is, the greater the value of r is. Further, if the working voltage of the photosensitive member (i.e. charging voltage) is in the range from −700V to −900V, r can be any one of the positive integers between 30 and 54 in order to approach the best performance. Because optical measurement can be easily achieved by those skilled in the art, it will not be depicted herein.

Figure 4:
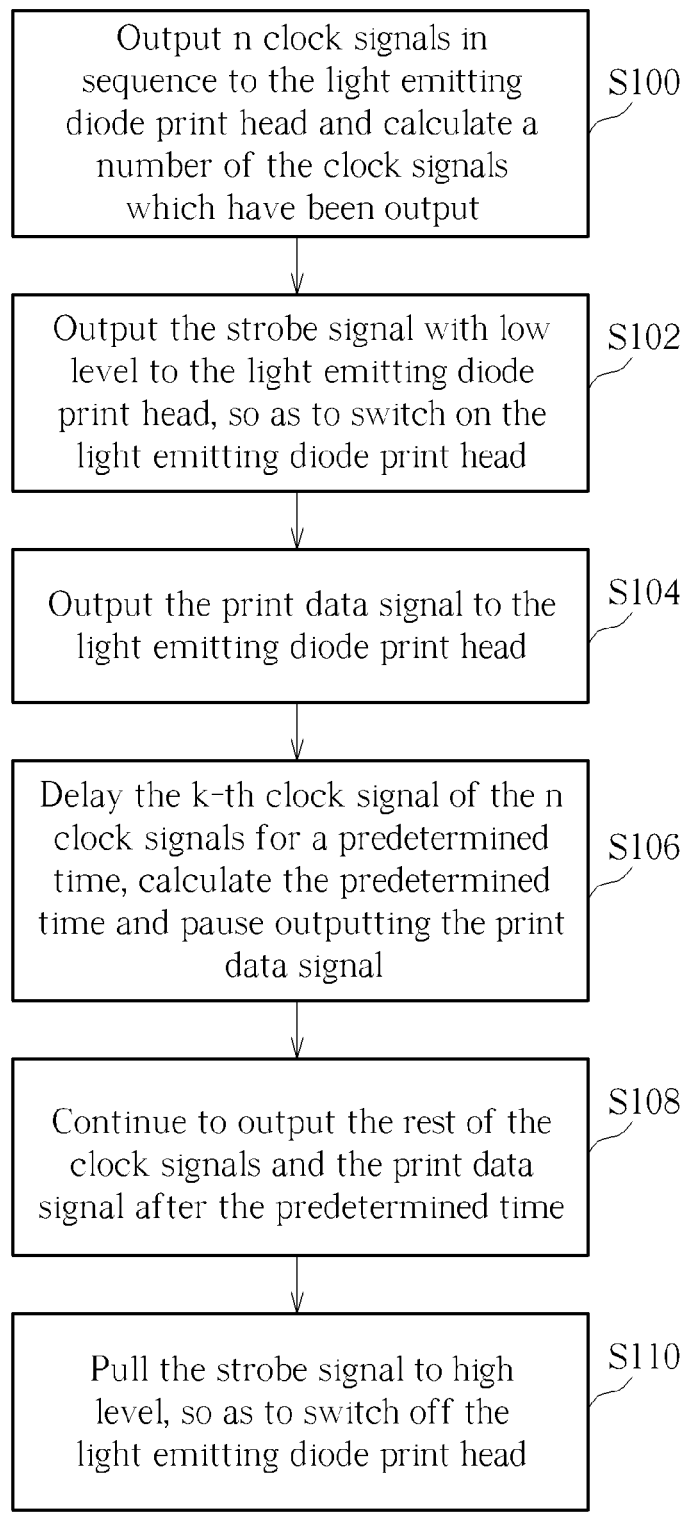
FIG. 4 is a flow chart illustrating a light emitting control method according to one embodiment of the invention.

Referring to FIG. 4, FIG. 4 is a flow chart illustrating a light emitting control method according to one embodiment of the invention. Also, referring to FIG. 2 together with the aforesaid light emitting control device 1, the light emitting control method of the invention comprises the following steps. First of all, step S100 is performed to output n clock signals 24 in sequence to the light emitting diode print head 3 and calculate a number of the clock signals 24 which have been output. Afterward, step S102 is performed to output the strobe signal 26 with low level to the light emitting diode print head 3, so as to switch on the light emitting diode print head 3. Step S104 is then performed to output the print data signal 28 to the light emitting diode print head 3. Step S106 is then performed to delay the k-th clock signal 24 of the n clock signals 24 for a predetermined time Te, calculate the predetermined time Te and pause outputting the print data signal 28. Step S108 is then performed to continue to output the rest of the clock signals 24 and the print data signal 28 after the predetermined time Te. Finally, step S110 is performed to pull the strobe signal 26 to high level, so as to switch off the light emitting diode print head 3.

Based on the aforesaid embodiments, the light emitting control device and method thereof for the light emitting diode print head of the invention at least have following advantages and benefits. The invention delays one of the clock signals and corresponding print data signal, so as to enhance the maximum light emitting time of the light emitting diode print head. Enhancement of the light emitting time is the aforesaid predetermined time. Accordingly, the time for transferring print data will also increase the predetermined time rather than double the original print time. In circuit design, it only needs a few more circuits. Furthermore, due to no change of the clock signal in the system, the original parameters for firmware can still be applied.

Those skilled in the art will readily observe that numerous modifications and alterations of the device and method may be made while retaining the teachings of the invention.

What is claimed is:

1. A light emitting control device for a light emitting diode print head comprising:
   a control unit;
   a pulse-mask unit, controlled by the control unit, outputting n clock signals in sequence to the light emitting diode print head, n being a positive integer;
   a strobe unit, controlled by the control unit, outputting a strobe signal to the light emitting diode print head to switch on the light emitting diode print head; and
   a data output unit, controlled by the control unit, outputting a print data signal to the light emitting diode print head;
   wherein when the pulse-mask unit outputs a k-th clock signal of the n clock signals, the pulse-mask unit delays the k-th clock signal for a predetermined time, and the data output unit pauses outputting the print data signal, after the predetermined time, the pulse-mask unit and the data output unit continues to output the rest of the clock signals and the print data signal, k is a positive integer smaller than or equal to n.

2. The light emitting control device of claim 1, further comprising a first counter for calculating a number of the clock signals which have been output.

3. The light emitting control device of claim 1, further comprising a second counter for calculating the predetermined time.

4. The light emitting control device of claim 1, wherein the predetermined time is r times a period of the clock signal, and r is a positive integer.

5. The light emitting control device of claim 1, wherein k is a median of n.

6. A light emitting control method for a light emitting diode print head comprising steps of:
   outputting n clock signals in sequence to the light emitting diode print head, n being a positive integer;
   outputting a strobe signal to the light emitting diode print head to switch on the light emitting diode print head;
   outputting a print data signal to the light emitting diode print head;
   delaying a k-th clock signal of the n clock signals for a predetermined time, and pausing outputting the print data signal, k being a positive integer smaller than or equal to n; and
   after the predetermined time, continuing to output the rest of the clock signals and the print data signal.

7. The light emitting control method of claim 6, further comprising step of calculating a number of the clock signals which have been output while outputting the n clock signals in sequence.

8. The light emitting control method of claim 6, further comprising step of calculating the predetermined time while delaying the k-th clock signal.

9. The light emitting control method of claim 6, wherein the predetermined time is r times a period of the clock signal, and r is a positive integer.

10. The light emitting control method of claim 6, wherein k is a median of n.

* * * * *